Aug. 29, 1939.　　G. L. MOORE ET AL　　2,171,163
FASTENING DEVICE
Filed Oct. 20, 1937　　2 Sheets-Sheet 1

Inventors
George L. Moore
and James R. Steel.
By R. S. C. Dougherty
Attorney

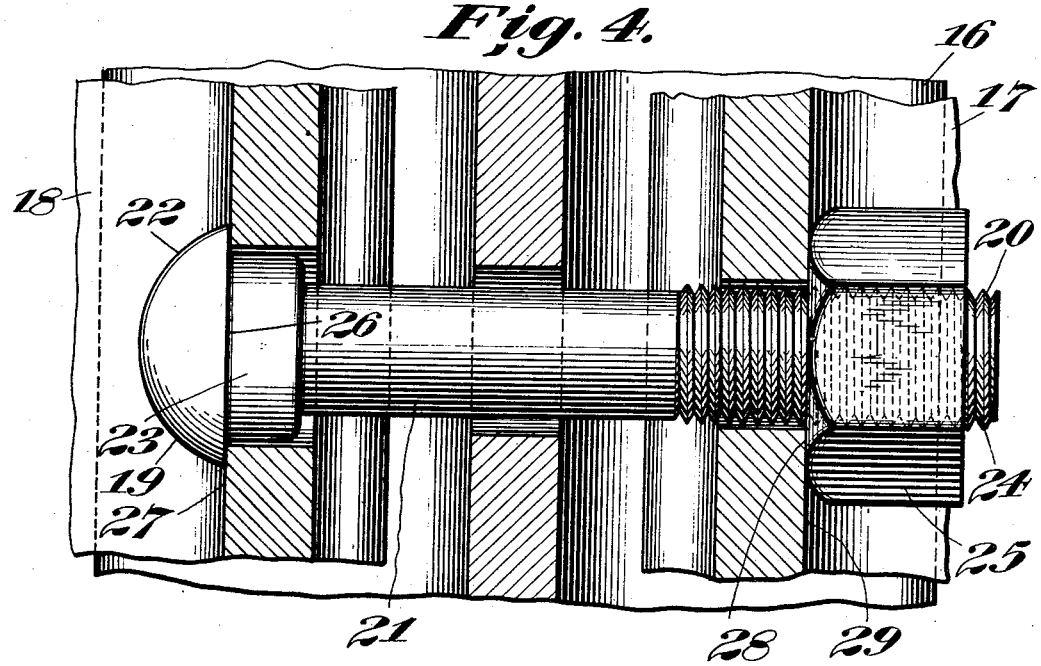

Patented Aug. 29, 1939

2,171,163

UNITED STATES PATENT OFFICE 2,171,163

FASTENING DEVICE

George Loop Moore and James Robert Steele, Owego, N. Y.

Application October 20, 1937, Serial No. 169,950

1 Claim. (Cl. 85—1)

Our invention relates to improvements in fastening devices and particularly to fastening devices for use in connection with railway track structures.

One object of our invention is to provide a fastening device which, when applied to a structure, will require no additional attention to insure the efficient fastening of the parts to which the fastener is applied.

Another object of our invention is to provide a fastening device which will automatically lock itself against displacement when the device is applied to the members of the structure to be fastened.

The novel features of our invention will be more fully understood from the following description and claims taken with the accompanying drawings in which:

Fig. 4 is a sectional view of the track structure, similar to Fig. 3, showing the fastening device in its assembled position.

Figure 1:
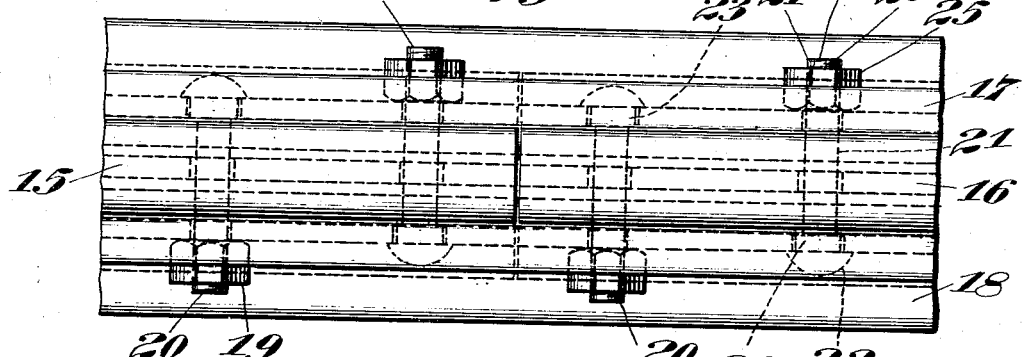
Fig. 1 is a top plan view of a track structure embodying our improved fastening device.

Referring to the drawings, we show our fastening device assembled with members of a track structure, wherein 15 and 16 designate adjoining rails connected by splice bars 17 and 18, and 19 designates a fastening device incorporating our invention for retaining the splice bars 17 and 18 in their assembled condition with the rails 15 and 16.

Figure 2:
Fig. 2 is a top plan view of one form of our novel fastening device.
Figure 3:
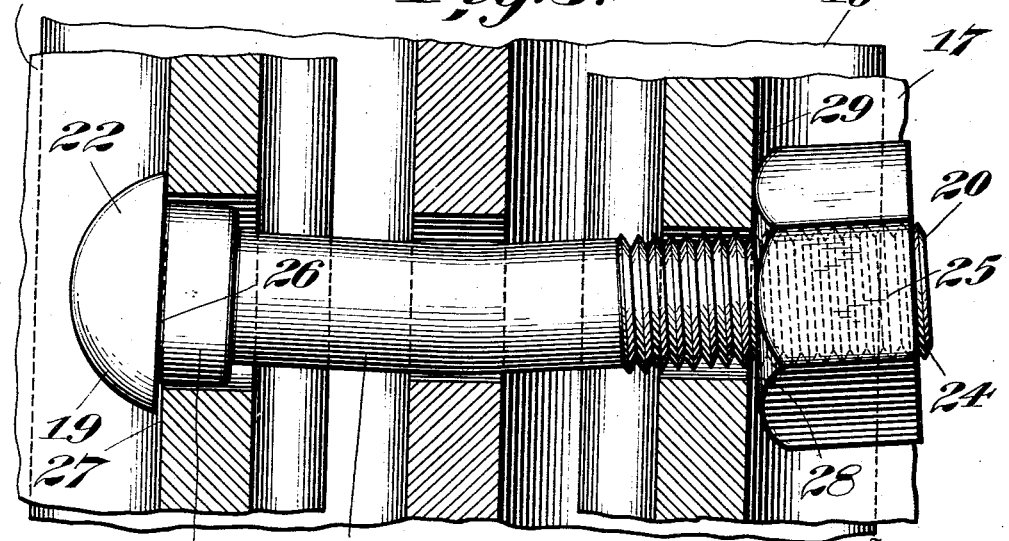
Fig. 3 is a sectional view of the track structure showing our fastening device partially assembled therewith.

Referring to Figs. 1 to 4, inclusive, of the drawings, the fastening device 19 comprises a bolt 20 having a shank 21, a head 22. The shank 21 is provided at one end with a shoulder 23 and is threaded at 24 to receive the nut 25. The shank 21 of the bolt, as shown in Figs. 2 and 3, inclusive is bent intermediate the shoulder 23 and the threaded portion 24, so that when the bolt 20 is initially applied to the structure to be fastened and the nut 25 applied, as shown in Fig. 3 of the drawings, the inner face 26 of the head 22 of the bolt is angularly disposed with reference to the face 27 of the track structure and the major portion of the axis of the bolt 20 is at an angle to the axis of the openings through the track structure and the face 28 of the nut is angularly disposed with reference to the face 28 of the track structure and the faces 26 and 28, respectively, of the bolt and nut are obliquely disposed with reference to each other.

The continued screwing home of the nut will cause the shank 21 to straighten and the face 26 of the head of the bolt to come into contact with the face 27 of the structure and substantially parallel to the face 28 of the nut 25, as plainly shown in Fig. 4. This manipulation also causes a substantial amount of tension to be set up in the bolt due to the straightening of the shank 21, and due to the tendency of the shank to resume its normally bent condition the nut 25 is securely locked against rotation due to its engagement with the face of the structure, as the tension on one portion of its face 28 is greater than the tension on the diametrically opposite portion of the face 28.

When these bolts are to be used for railroad track purposes, especially such as shown in the drawings, it is essential that they withstand considerable shocks and we have found that with our improved fasteners, lock washers and other such locking devices can be dispensed with.

To obtain a bolt which will meet these requirements, we prefer that the bolts be heat treated after bending. One of the methods we use is to heat the bolts or bolt blanks to between 1600 and 1700 degrees F. and then bend the bolts and quench them in oil at between 1475 and 1550 F. degrees. The bolts may then be subjected to a drawing temperature of 1000 F. degrees for 30 or 40 minutes and air cooled, although this drawing operation is not always essential.

The bolt thus produced according to our invention contains certain novel characteristics not inherent in any other known bolt, that is a bent bolt which is first bent and then treated to provide a set in the bolt after it is bent and thereby provide a bent spring bolt which has the tendency to return to its preformed bent position when it is applied as a fastener to a structure with one side of the face of the head or nut in contact with the face of the structure when the nut is screwed onto the bolt in initial contact with the structure and which is straightened upon the further tightening of the nut by bringing the inner faces of the nut and bolt head substantially parallel to the faces of the structure and to each other.

From the foregoing it will be obvious to those skilled in the art that we have devised an improved fastening device which is simple in construction, which is easily applied to a track structure and which effectively retains the parts of said structure in their assembled condition.

While we have shown our invention in a plurality of forms, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claim.

Having thus described our invention, what we claim as new and desire to secure by Letters Patent is:

A fastening device comprising a preformed bolt having a bowed resilient shank, and a head and nut whose gripping faces each are disposed substantially at right angles to the bolt axis nearest it and obliquely disposed relative to each other.

GEORGE L. MOORE.
JAMES ROBERT STEELE.